(12) United States Patent
Li

(10) Patent No.: US 10,109,079 B2
(45) Date of Patent: Oct. 23, 2018

(54) METHOD AND APPARATUS FOR PROCESSING TAB IN GRAPHICAL INTERFACE

(71) Applicant: Tencent Technology (Shenzhen) Company Limited, Shenzhen (CN)

(72) Inventor: Bin Li, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 15/715,628

(22) Filed: Sep. 26, 2017

(65) Prior Publication Data

US 2018/0018795 A1 Jan. 18, 2018

Related U.S. Application Data

(63) Continuation of application No. PCT/CN2016/101624, filed on Oct. 10, 2016.

(30) Foreign Application Priority Data

Nov. 18, 2015 (CN) .......................... 2015 1 0796799

(51) Int. Cl.
*G09G 5/02* (2006.01)
*G06T 11/00* (2006.01)
*G06F 3/0483* (2013.01)
*G06F 3/0484* (2013.01)
*G06F 9/451* (2018.01)
*G06F 3/0488* (2013.01)

(52) U.S. Cl.
CPC .......... *G06T 11/001* (2013.01); *G06F 3/0483* (2013.01); *G06F 3/04847* (2013.01); *G06F 9/451* (2018.02); *G06F 3/0488* (2013.01)

(58) Field of Classification Search
CPC .......................... G09G 5/02; G09G 2320/0666
USPC ........................................................ 345/594
See application file for complete search history.

(56) References Cited

U.S. PATENT DOCUMENTS

| 7,587,679 B1 * | 9/2009 | Sundermeyer | G06F 3/0483 |
| | | | 715/765 |
| 9,311,289 B1 * | 4/2016 | Kaptur | G06F 17/246 |
| 2002/0161803 A1 * | 10/2002 | Shelton | G06F 17/30905 |
| | | | 715/275 |

(Continued)

FOREIGN PATENT DOCUMENTS

| CN | 103440326 | * 12/2013 |
| CN | 104965631 | * 10/2015 |

*Primary Examiner* — Jin Ge
(74) *Attorney, Agent, or Firm* — Brinks Gilson & Lione

(57) ABSTRACT

This disclosure relates to a method and an apparatus for processing a tab in a graphical interface. In this disclosure, when a page access request triggered by a user by using a graphical interface is received, a corresponding page is obtained according to the page access request; whether a tab background color has been set for the page is detected; if the tab background color has been set, a background color is applied to a tab corresponding to the page according to the tab background color; or if the tab background color has not been set, a primary color of the page is extracted, and a background color is applied to a tab corresponding to the page according to the primary color; and the pages and the colored tabs are displayed in the graphical interface. This solution helps a user identify a tab to facilitate viewing webpages.

17 Claims, 6 Drawing Sheets

(56) References Cited

U.S. PATENT DOCUMENTS

| | | | | |
|---|---|---|---|---|
| 2003/0128235 | A1* | 7/2003 | Chernow | G06F 9/542 |
| | | | | 715/744 |
| 2005/0015722 | A1* | 1/2005 | Niyogi | G06F 17/2247 |
| | | | | 715/234 |
| 2008/0120570 | A1* | 5/2008 | Adams | G06F 9/4445 |
| | | | | 715/804 |
| 2009/0037831 | A1* | 2/2009 | Best | G06F 9/4443 |
| | | | | 715/764 |
| 2009/0187481 | A1* | 7/2009 | Bonzi | G06Q 30/02 |
| | | | | 705/14.66 |
| 2010/0076863 | A1* | 3/2010 | Golomb | G06F 17/3089 |
| | | | | 705/26.1 |
| 2015/0091935 | A1* | 4/2015 | Zhang | G06F 17/30905 |
| | | | | 345/589 |

* cited by examiner

METHOD AND APPARATUS FOR PROCESSING TAB IN GRAPHICAL INTERFACE

CROSS-REFERENCE TO RELATED APPLICATION

This application is a continuation application of PCT/CN2016/101624, filed on Oct. 10, 2016, which claims priority to Chinese Patent Application No. 201510796799.4, filed with the Chinese Patent Office on Nov. 18, 2015 and entitled "METHOD AND APPARATUS FOR PROCESSING TAB IN GRAPHICAL INTERFACE" both of which are incorporated by reference in their entireties.

FIELD OF THE TECHNOLOGY

This application relates to the field of communications technologies, and specifically, to a method and an apparatus for processing a tab in a graphical interface.

BACKGROUND OF THE DISCLOSURE

A graphical interface, also referred to as a graphical user interface (GUI), is a computer operating user interface displayed in a graphical manner. A browser is one type of a graphical interface. The browser refers to software that can display content of Hypertext Markup Language (HTML) files from a web server or a file system and that can enable interaction between a user and the files.

To facilitate user operations, most current browsers display web pages or files by using multiple tabs. Tabs are mainly located in a tab bar of a browser. As a container of tabs, a tab bar is mainly used for managing all web pages opened by a user. Generally, one tab corresponds to one open web page or file, and a favicon (also referred to as a shortcut icon) and a website title (or file title) are generally displayed in the tab. When a user needs to browse a web page or a file, the user may click a corresponding tab to open the corresponding web page or file, thereby managing multiple open web pages in one browser.

SUMMARY

Embodiments of this application provide a method and an apparatus for processing a tab in a graphical interface, so as to improve identifiability of a tab, and improve recognition and propagation of information in the tab when facilitating viewing and an operation of a user.

The embodiments of this application provide a method for processing a tab in a graphical interface, including:

receiving a page access request triggered by a user by using a graphical interface;

obtaining a corresponding page according to the page access request;

detecting whether a tab background color has been set for the page;

if the tab background color has been set, applying a background color to a tab corresponding to the page according to the tab background color, to obtain a colored tab; or if the tab background color has not been set, extracting a primary color of the page, and applying a background color to a tab corresponding to the page according to the primary color, to obtain a colored tab; and displaying the page and the colored tab in the graphical interface.

The embodiments of this application further provide an apparatus for processing a tab in a graphical interface, including:

a receiving unit, configured to receive a page access request triggered by a user by using a graphical interface;

an obtaining unit, configured to obtain a corresponding page according to the page access request;

a detection unit, configured to detect whether a tab background color has been set for the page;

a first applying unit, configured to: when the detection unit determines that the tab background color has been set, apply a background color to a tab corresponding to the page according to the tab background color, to obtain a colored tab;

a second applying unit, configured to: when the detection unit determines that the tab background color has not been set, extract a primary color of the page, and apply a background color to a tab corresponding to the page according to the primary color, to obtain a colored tab; and a display unit, configured to display the page and the colored tab in the graphical interface.

The embodiments of this application further provide an apparatus for processing a tab in a graphical interface, including a processor and a memory connected to the processor, the memory storing machine readable instructions, and the processor executing the machine readable instructions to perform the following operations:

receiving a page access request triggered by a user by using a graphical interface;

obtaining a corresponding page according to the page access request;

detecting whether a tab background color has been set for the page;

if the tab background color has been set, applying a background color to a tab corresponding to the page according to the tab background color, to obtain a colored tab; or if the tab background color has not been set, extracting a primary color of the page, and applying a background color to a tab corresponding to the page according to the primary color, to obtain a colored tab; and displaying the page and the colored tab in the graphical interface.

The embodiments of this application further provide a non-volatile computer readable storage medium, the storage medium storing machine readable instructions, the machine readable instructions being executed by a processor to complete the following operations:

receiving a page access request triggered by a user by using a graphical interface;

obtaining a corresponding page according to the page access request;

detecting whether a tab background color has been set for the page;

if the tab background color has been set, applying a background color to a tab corresponding to the page according to the tab background color, to obtain a colored tab; or if the tab background color has not been set, extracting a primary color of the page, and applying a background color to a tab corresponding to the page according to the primary color, to obtain a colored tab; and displaying the page and the colored tab in the graphical interface.

According to the embodiments of this application, when a page access request triggered by a user by using a graphical interface is received, a corresponding page is obtained according to the page access request; whether a tab background color has been set for the page is detected; if the tab background color has been set, a background color is applied to a tab corresponding to the page according to the tab background color, to obtain a colored tab; or if the tab background color has not been set, a primary color of the page is extracted, and a background color is applied to a tab corresponding to the page according to the primary color, to obtain a colored tab; and the page and the colored tab are displayed in the graphical interface. In the solutions, different background colors may be set for tabs of different pages. Therefore, identifiability of a tab is significantly improved, which is conductive to distinguishing between tabs. That is, the solution not only helps a user identify a tab to facilitate viewing and an operation of the user, but also improves recognition and propagation of information in the tab.

BRIEF DESCRIPTION OF THE DRAWINGS

To describe the technical solutions of the embodiments of this application more clearly, the following briefly introduces the accompanying drawings for describing the embodiments.

DESCRIPTION OF EMBODIMENTS

The following describes the technical solutions in the embodiments of this application with reference to the accompanying drawings in the embodiments of this application. Apparently, the described embodiments are merely exemplary embodiments of this disclosure rather than all of the embodiments. All other embodiments obtained by a person skilled in the art based on the embodiments of this disclosure without creative efforts shall fall within the protection scope of this disclosure.

Because one browser may include multiple tabs at the same time, and the tabs may be similar, during viewing and an operation, it may be difficult for a user to distinguish between the tabs. That is, identifiability of the tabs is not high. This not only reduces operability by a user but also significantly affects recognition and propagation of information in the tabs.

The embodiments of this disclosure provide methods and apparatus for processing a tab in a graphical interface. According to the solutions of the embodiments of this disclosure, a page access request triggered by a user by using a graphical interface is received; a corresponding page is obtained according to the page access request; whether a tab background color has been set for the page is detected; if the tab background color has been set, a background color is applied to a tab corresponding to the page according to the tab background color, to obtain a colored tab; or if the tab background color has not been set, a primary color of the page is extracted, and a background color is applied to a tab corresponding to the page according to the primary color, to obtain a colored tab; and the pages and the colored tabs are displayed in the graphical interface. In the solutions, different background colors may be set for tabs of different pages. Therefore, identifiability of a tab is significantly improved. The tabs can thus be easily distinguished by users. That is, the solution not only helps a user identify a tab to facilitate viewing and general operability, but also improves recognition and propagation of information in the tab.

In the embodiments of this disclosure, the primary color of the page indicates a basic trend of a color appearance of the page. Although multiple colors may be used in the page, the colors present a trend as a whole, for example, blue or red. The basic trend of the color appearance is the primary color of the page.

The following describes the method and the apparatus provided in the embodiments of this disclosure in detail.

Figure 1:
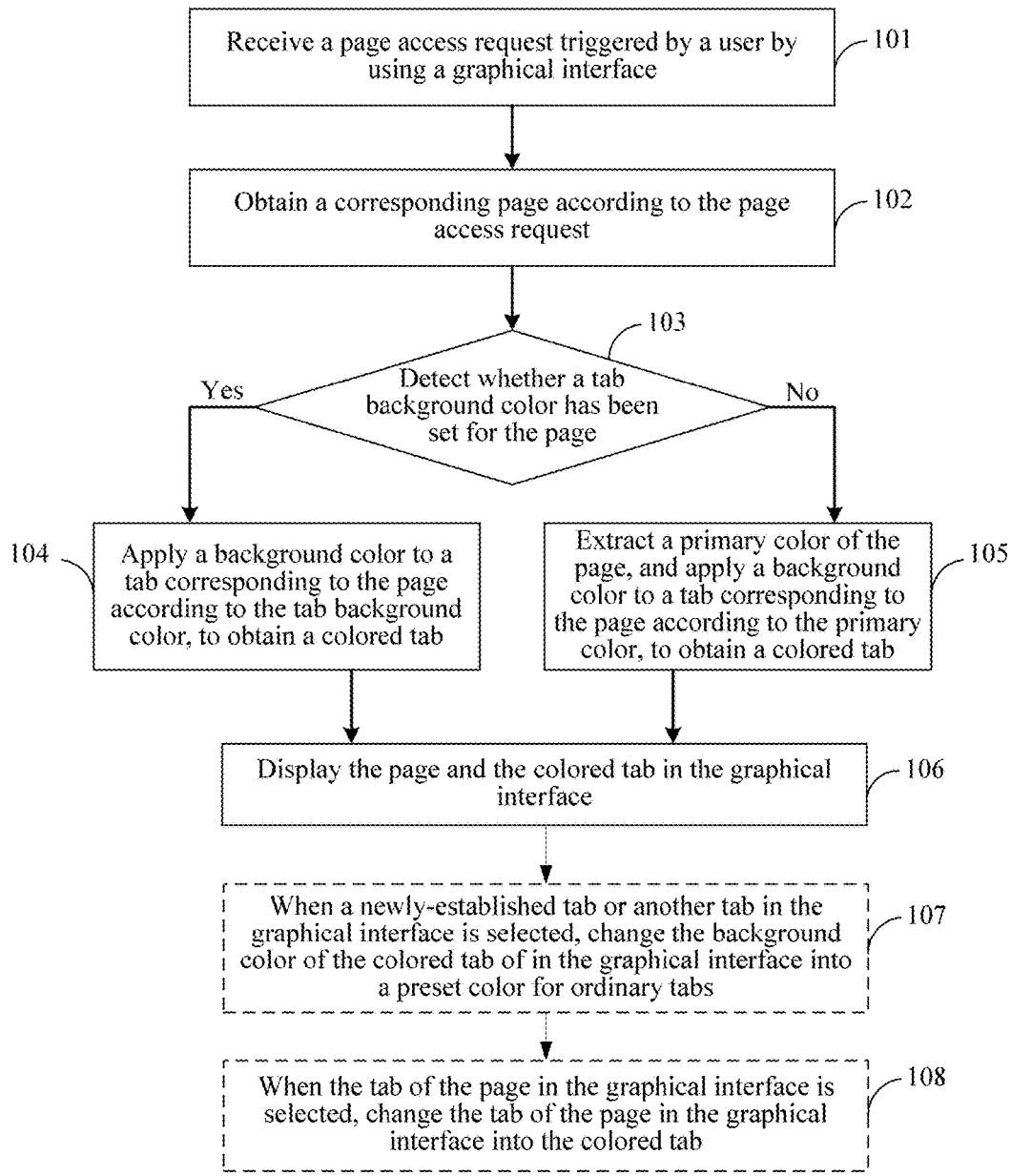
FIG. 1 is a flowchart of a method for processing a tab in a graphical interface.

FIG. 1 is a flowchart of a method for processing a tab in a graphical user interface (alternatively referred to as graphical interface) according to an embodiment of this disclosure. This embodiment is described from the perspective of an apparatus for processing a tab in a graphical interface. The apparatus for processing a tab in a graphical interface may be specifically integrated in a device such as a terminal, or may be installed in a device such as a terminal in a form of software. The terminal may be specifically a device such as a mobile phone, a tablet computer, a notebook computer, or a personal computer (PC).

As shown in FIG. 1, a specific process of the method for processing a tab in a graphical interface may be as follows:

101: Receive a page access request triggered by a user by using a graphical interface.

For example, specifically, a link address entered by the user in an address bar in the graphical interface may be received, to trigger the page access request. Alternatively, a link interface or a trigger key in the graphical interface may be clicked by the user to trigger the page access request. Details are not further provided herein.

The page access request may carry information such as an address of a page that needs to be accessed.

The graphical interface may be specifically a browser or another application that is used for displaying content of HTML files from a web server or a file system and that can enable interaction between the user and the files. For ease of description, in this embodiment of this disclosure, the browser is used as an example for description.

102: Obtain a corresponding page according to the page access request.

For example, the page access request may be sent to a corresponding web server according to the address of the page that is carried in the page access request, and a web page returned by the web server according to the page access request is received. A page may be data information page of other type. A page may be alternatively referred to as a data page.

For another example, the page access request may be sent to a corresponding device according to the address of the page that is carried in the page access request, and a file such as a picture or a video returned by the device according to the page access request is received.

103: Detect whether a tab background color has been set for the page. If the tab background color has been set, step 104 is performed; if the tab background color has not been set, step 105 is performed.

There are multiple detection manners, and a detection manner may be specifically determined according to a setting manner of the tab background color. The tab background color may also be set in multiple manners. For example, a tab background color parameter may be set in content of a page, and the tab background color may be set by assigning a value to the tab background color parameter. Alternatively, the tab background color may be set by specifying a link address of the tab background color, for example, a uniform resource locator (URL).

For example, the foregoing two tab background color setting manners are used as examples, and corresponding detection manners may be specifically as follows:

(1) Manner 1:

Content of the page is obtained, the content of the page including a tab background color parameter; whether a value of the tab background color parameter is a preset value is determined; and if the value of the tab background color parameter is the preset value, it is determined that the tab background color has been set, and the tab background color is determined according to the preset value; or if the value of the tab background color parameter is not the preset value, it is determined that the tab background color has not been set.

The content of the page may include an HTML file and a cascading style sheet (CSS) file. Related information of the CSS may also be embedded into the HTML file. Therefore, the content of the page may be obtained by parsing the HTML file and the CSS file on the page.

The preset value may be determined according to a requirement in an actual application. The preset value may be one value, several values, or a range of one value or several values. Details are not further provided herein.

(2) Manner 2:

Whether there is a corresponding link address of the tab background color on the page is determined; and if there is a corresponding link address of the tab background color on the page, it is determined that the tab background color has been set, and the tab background color is obtained according to the link address; or if there is no corresponding link address of the tab background color on the page, it is determined that the tab background color has not been set.

The link address of the tab background color may be set by a website on which a page is located (that is, may be set by using a default URL in a fixed rule), or may be set in page content, for example, web content. Specific composition elements of the link address may be determined according to a requirement in an actual application, for example, by using a domain name plus a particular path (for example, tab-background-color).

104: When it is determined that the tab background color has been set, apply a background color to a tab corresponding to the page according to the tab background color, to obtain a colored tab.

It should be noted that in addition to colors corresponding to "color" in the conventional sense, "color" in the colored tab in this embodiment of the present invention further includes various colors in black, white, and other colors defined by, e.g., R, G, B values, and even may include "transparency". That is, the colored tab herein is a "tab to which a color is applied according to the tab background color" but does not mean that a background color of the tab is "colorful".

105: When it is determined that the tab background color has not been set, extract a primary color of the page, and apply a background color to a tab corresponding to the page according to the primary color, to obtain a colored tab.

The primary color of the page may be extracted in multiple manners. For example, an icon (favicon) of the page may be determined; then, a primary color of the icon is extracted; and the primary color of the page is calculated according to the primary color of the icon. The icon of the page, that is, the favicon, is usually displayed on the left side of a tab bar, or may be displayed in bookmarks or history records. Alternatively, the primary color of the page content when displayed by a browser may be extracted and set as the background color of the tab.

It should be noted that the primary color of the icon or the displayed page may be extracted in multiple manners. For example, the primary color may be extracted according to a proportion of a number of pixels having a particular color, and then the primary color of the page is calculated by using a preset algorithm. In one implementation, the displayed page or the favicon may first be pixelized. Pixelization of the page content for example, may be obtained by analyzing the HTML file of the page and the include file therein (images, videos, and other files). The R, G, B values of the pixels of either the pixelized page or the pixelzied favicon may be averaged to obtain a single average color represented by the averaged R, G and B values of all pixels. Alternatively, the pixels of either the page or the favicon may be binned according to predefined color bins in the R, G, B space, and the color bin having the largest number of pixels may be considered the primary color of the page or the favicon. In one implementation and when the displayed page content is used to extract the primary color, some pixels, such as those of particular color, e.g., white, may be ignored since most page contents have white background and it may be preferable to not weigh any of the white background pixels in determining the primary color of the page. Different primary colors of a page may be obtained by using different algorithms. Details are not further provided herein.

106: Display the page and the colored tab in the graphical interface.

For example, specifically, content of the page may be displayed in a page display area in the graphical interface, and the colored tab may be displayed in a tab bar. The tab bar refers to a container of tabs, is an area used for displaying and managing the tabs, and is usually located on the top of the graphical interface such as a browser.

In some embodiments of this disclosure, it may be further set that the tab of the page is displayed as the colored tab only when the page is activated, for example, when a user clicks the tab corresponding to the page to browse the page. Otherwise, the tab of the page may be displayed as an ordinary tab. The ordinary tab is a tab that is not different from other tabs in background color. A background color of the ordinary tab may also be preset according to a requirement in an actual application. That is, after the step of "displaying the page and the colored tab in the graphical interface (that is, step 106)", the method for processing a tab in a graphical interface may further include:

Step 107: When a newly-established tab or another tab in the graphical interface is selected, change the background color of the colored tab displayed in the graphical interface into a preset color (such as a preset ordinary or default background color not different from other ordinary tabs).

After this, if the tab of the page in the graphical interface is selected again, for example, when the user clicks the tab of the page, the tab of the page in the graphical interface may be changed into the colored tab again for highlighting, to indicate that the page corresponding to the colored tab is a page that is currently being browsed by the user. That is, after the step of "changing the background color of the colored tab displayed in the graphical interface into a preset color (that is, step 107)", the method for processing a tab in a graphical interface may further include:

Step 108: When the tab of the page in the graphical interface is selected, change the tab of the page in the graphical interface into the colored tab.

In some embodiments of this disclosure, to facilitate setting of the tab background color in a page, an interface for dynamically setting the tab background color may be further provided in the graphical interface. If the tab background color needs to be set, the corresponding interface is invoked to implement setting of the tab background color. That is, the method for processing a tab in a graphical interface may further include:

setting the tab background color of the page.

Figure 2:
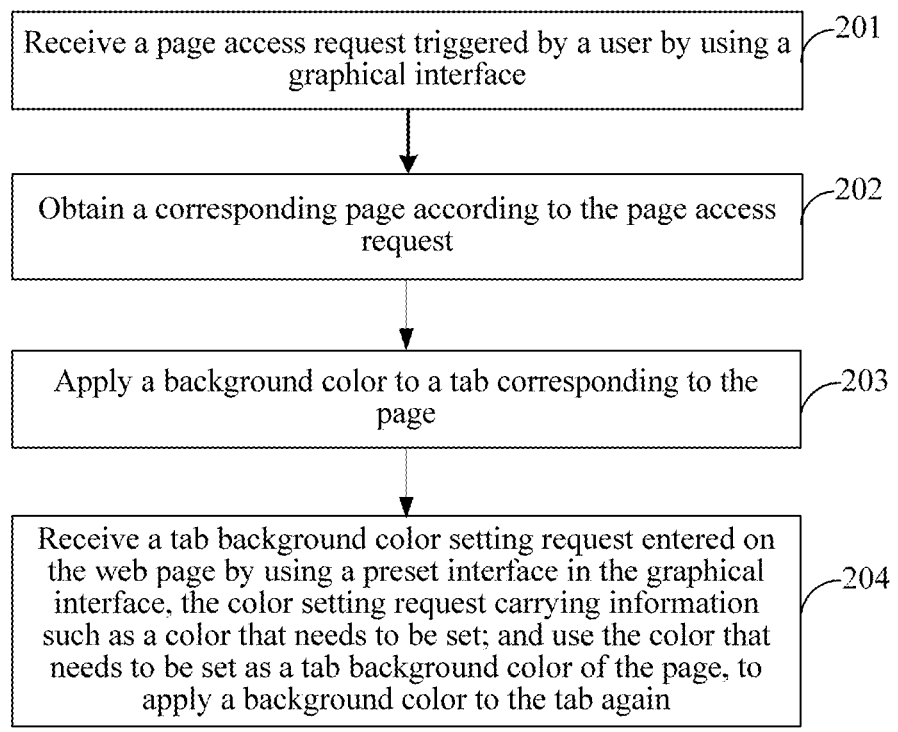
FIG. 2 is another flowchart of a method for processing a tab in a graphical interface according.

FIG. 2 is a flowchart of a method for processing a tab in a graphical interface according to an embodiment of this disclosure. As shown in FIG. 2, the method includes the following operations:

Step 201: Receive a page access request triggered by a user by using a graphical interface.

Step 202: Obtain a corresponding page according to the page access request.

In this embodiment of this disclosure, step 201 and step 202 are respectively the same as step 101 and step 102 shown in FIG. 1. Details are not further provided herein.

Step 203: Apply a background color to a tab corresponding to the page.

In this step, when a background color is to be applied to the tab corresponding to the page, a primary color may be extracted, and then the background color is applied to the tab corresponding to the page according to the primary color. Alternatively, a background color of an ordinary tab may be applied to the tab corresponding to the page. That is, the tab corresponding to the page is not different from other tabs in background color. Alternatively, a tab background color obtained from a web page or a set URL may be applied.

Step 204: Receive a tab background color setting request entered on the page by using a preset interface in the graphical interface, the background color setting request carries information such as a color that needs to be set; and use the color that needs to be set as a tab background color of the page, to apply a background color to the tab again.

The preset interface may be set according to a requirement in an actual application. Details are not further provided herein.

It can be understood from the foregoing descriptions that in this embodiment, when a page access request triggered by a user by using a graphical interface is received, a corresponding page is obtained according to the page access request; whether a tab background color has been set for the page is detected; if the tab background color has been set, a background color is applied to a tab corresponding to the page according to the tab background color, to obtain a colored tab; or if the tab background color has not been set, a primary color of the page is extracted, and a background color is applied to a tab corresponding to the page according to the primary color, to obtain a colored tab; and the page and the colored tab are displayed in the graphical interface. In this solution, different background colors may be set for tabs of different pages, so that the tabs highlight brand information of websites. Therefore, identifiability of a tab is significantly improved. The tabs can thus be easily distinguished by users. In addition, in this solution, a background color may be flexibly set for a tab according to a different case. For example, when it is detected that a tab background color is preset, the preset tab background color is used as a background color of a tab; when it is detected that no tab background color is preset, an extracted primary color of a page is used as a background color of a tab background color. A preset tab background color can help avoid a recognition error or even a recognition failure caused in a scenario in which a primary color is not easily extracted from some pages. For example, an icon of a website includes multiple different colors having same or similar proportions or a primary color of an icon of a website is inconsistent with a primary color of website content, thereby helping improving recognition efficiency and a recognition of the page.

In conclusion, the solution not only helps a user identify a tab to facilitate viewing and improve operability by the user, but also improves recognition efficiency and a recognition effect of the page as well as an effectiveness of recognizing and propagating information in a tab.

Figure 3A:
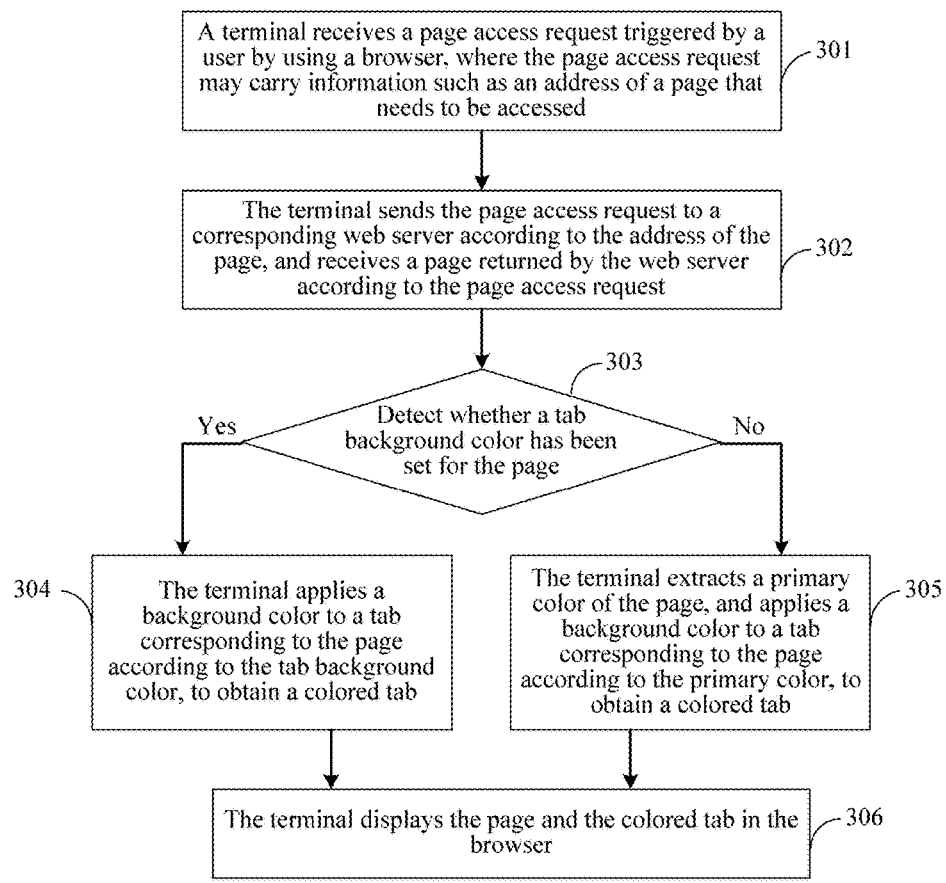
FIG. 3a is still another flowchart of a method for processing a tab in a graphical interface.

FIG. 3a is another flowchart of a method for processing a tab in a graphical interface according to an embodiment of this disclosure. In the embodiment shown in FIG. 3a, that the graphical interface is specifically a browser and the apparatus for processing a tab in a graphical interface is specifically integrated in a terminal is used as an example for description. The apparatus for processing a tab in a graphical interface may integrated in the terminal in multiple manners. For example, the apparatus may be installed in a browser of the terminal as a plug-in, or may be installed in the terminal as an application. Details are not further provided herein. It should be noted that for ease of description, in this embodiment, that the apparatus for processing a tab in a graphical interface is integrated in a terminal is only used as an example for description, and a specific integration manner of the apparatus is not limited.

Referring to FIG. 3a, a specific process of the method for processing a tab in a graphical interface may be as follows:

301: The terminal receives a page access request triggered by a user by using a browser, where the page access request may carry information such as an address of a page that needs to be accessed.

For example, the user may enter a link address of a website that needs to be accessed in an address bar of the browser of the terminal. In this way, the user may generate the page access request according to the link address of the website that needs to be accessed. Alternatively, the user may click a link address of a website in the browser to trigger the page access request.

302: The terminal sends the page access request to a corresponding web server according to the address of the page that is carried in the page access request, and receives a page returned by the web server according to the page access request.

303: The terminal detects whether a tab background color has been set for the page. If the tab background color has been set, step 304 is performed; if the tab background color has not been set, step 305 is performed.

There are multiple detection manners, and a detection manner may be specifically determined according to a setting manner of the tab background color. The tab background color may also be set in multiple manners. For example, a tab background color parameter may be set in content of a page, and the tab background color may be set by assigning a value to the tab background color parameter. Alternatively, the tab background color may be set by specifying a link address of the tab background color, for example, a URL.

For example, the foregoing two tab background color setting manners are used as examples, and corresponding detection manners may be specifically as follows:

(1) Manner 1:

Content of the page is obtained, the content of the page including a tab background color parameter; whether a value of the tab background color parameter is a preset value is determined; and if the value of the tab background color parameter is the preset value, it is determined that the tab background color has been set, and the tab background color is determined according to the preset value; or if the value of the tab background color parameter is not the preset value, it is determined that the tab background color has not been set.

The content of the page may include an HTML file and a CSS file. Related information of the CSS may also be embedded into the HTML file. Therefore, the content of the page may be obtained by parsing the HTML file and the CSS file on the page.

For example, in the CSS file, related information of a tab in the browser may be set, for example, adding a tab identifier to CSS information, and assigning a value to a background color of the tab by using a tab background color parameter "background-color". The browser may read the parameter to determine a tab background color of a corresponding page, and then applies a background color of the tab in the page according to the tab background color. For example, the background color of the tab in the browser may be set to gray by using the following example code.

```
<style>
tab{background-color: gray;}
</style>
```

The preset value may be determined according to a requirement in an actual application. The preset value may be one value, several values, or a range of one value or several values. Details are not further provided herein.

(2) Manner 2:

Whether there is a corresponding link address of the tab background color on the page is determined; and if there is a corresponding link address of the tab background color on the page, it is determined that the tab background color has been set, and the tab background color is obtained according to the link address; or if there is no corresponding link address of the tab background color on the page, it is determined that the tab background color has not been set.

The link address of the tab background color may be set by a website on which a page is located (that is, may be set by using a default URL in a fixed rule), or may be set in page content, for example, web content. Specific composition elements of the link address may be determined according to a requirement in an actual application, for example, by using a domain name plus a particular path (for example, tab-background-color).

For example, using a domain name plus a particular path and the link address being specifically a URL as an example, a default URL of a tab background color set for the website "www.123456789.com" may be as follows:

http://www.123456789.com/tab-background-color.

If the default URL is not used on the web page, the URL may be set in an HTML file. For example, the following code is set in a web page "www.123456789.com":

<linkrel="tab-background-color"href="/tab-background-color2"/>

An obtained URL of finding a tab background color is: http://www.123456789.com/tab-background-color2.

304: When determining that the tab background color has been set, the terminal applies a background color to a tab corresponding to the page according to the tab background color, to obtain a colored tab.

305: When determining that the tab background color has not been set, the terminal extracts a primary color of the page, and applies a background color to a tab corresponding to the page according to the primary color, to obtain a colored tab.

The primary color of the page may be extracted in multiple manners. For example, an icon (favicon) of the page may be determined; then, a primary color of the icon is extracted according to a proportion of a quantity of pixels; and the primary color of the page is calculated based on the primary color of the icon by using a preset algorithm. Alternatively, the primary color of the webpage content when displayed by a browser may be extracted and set as the background color of the tab.

It should be noted that the primary color of the icon or the displayed page may be extracted in multiple manners. For example, the primary color may be extracted according to a proportion of a number of pixels having a particular color, and then the primary color of the page is calculated by using a preset algorithm. In one implementation, the displayed page or the favicon may first be pixelized. Pixelization of the page content for example, may be obtained by analyzing the HTML file of the page and the include file therein (images, videos, and other files). The R, G, B values of the pixels of either the pixelized page or the pixelzied favicon may be averaged to obtain a single average color represented by the averaged R, G and B values of all pixels. Alternatively, the pixels of either the page or the favicon may be binned according to predefined color bins in the R, G, B space, and the color bin having the largest number of pixels may be considered the primary color of the page or the favicon. In one implementation and when the displayed page content is used to extract the primary color, some pixels, such as those of particular color, e.g., white, may be ignored since most web contents have white background and it may be preferable to not weigh any of the white background pixels in determining the primary color of the page. Different primary colors of a page may be obtained by using different algorithms. Details are not further provided herein.

306: The terminal displays the page and the colored tab in the browser.

For example, specifically, content of the page may be displayed in a page display area in the browser, and the colored tab may be displayed in a tab bar of the browser. For example, referring to FIG. 3b, a tab bar 310 of a browser includes tabs 311, 312, and 313 of a website A, a website B, and a website C respectively. Background colors of the tabs 311 and 312 of the website A and the website B are white, and a background color of the tab 313 of the website C is gray.

In some embodiments of this disclosure, it may be further set that the tab of the page is displayed as the colored tab only when the page is activated, for example, when a user clicks the tab corresponding to the page to browse the page. Otherwise, the tab of the page may be displayed as an ordinary tab. For example, referring to FIG. 3c, when the tab 312 of the website B is clicked, the tab 313 of the website C is changed from the colored tab (that is, gray, referring to FIG. 3b) into an ordinary tab, for example, a tab in a white background, and the tab 312 of the website B is changed into the colored tab, for example, a black tab.

Figure 3B:
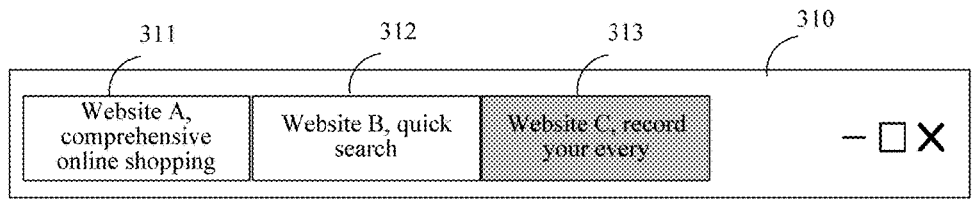
FIG. 3b is a schematic diagram of a tab in a graphical interface of a browser.
Figure 3C:
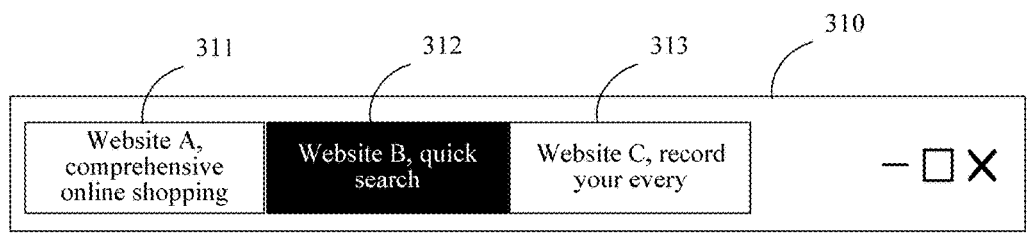
FIG. 3c is another schematic diagram of a tab in a graphical interface of a browser.

After this, if the tab of the page in the graphical interface (the browser) is selected again, for example, the user clicks the tab 313 of the website C again, the tab 313 of the website C may be changed into the colored tab again, that is, a tab in a gray background, refer to FIG. 3b.

In some embodiments of this disclosure, to facilitate setting of the tab background color in a web page, an interface for dynamically setting the tab background color may be further provided in the graphical interface (browser). If the tab background color needs to be set, the corresponding interface is invoked to implement setting of the tab background color. That is, the following steps may be further performed:

receiving a tab background color setting request entered on the web page by using a preset interface in the browser, the background color setting request carrying a color that needs to be set or other information; and using the color that needs to be set as the tab background color of the page.

The interface that is for setting the tab background color and that is provided by the browser is generally invoked by JavaScript® in a web page. The web page may select a suitable color value to serve as a background color of a tab according to characteristic of content on the web page. For example, if the tab background color needs to be set to gray, the following code may be set:

qqbrowser.tab.setBackgroundColor('gray').

It should be noted that the step of setting the tab background color and any one of step 301 to step 306 may be performed with no particular order. That is, the tab background color may be set at any time. Details are not further provided herein.

It can be understood from the foregoing descriptions that in this embodiment, when a page access request triggered by a user by using a browser is received, a corresponding page is obtained according to the page access request; whether a tab background color has been set for the page is detected; if the tab background color has been set, a background color is applied to a tab corresponding to the page according to the tab background color, to obtain a colored tab; or if the tab background color has not been set, a primary color of the page is extracted, and a background color is applied to a tab corresponding to the page according to the primary color, to obtain a colored tab; and the page and the colored tab are displayed in the browser. In this solution, different background colors may be set for tabs of different pages, so that the tabs highlight brand information of websites. Therefore, identifiability of a tab is significantly improved. The tabs can thus be easily distinguished by users. In addition, in this solution, a background color may be flexibly set for a tab according to a different case. For example, when it is detected that a tab background color is preset, the preset tab background color is used as a background color of a tab; when it is detected that no tab background color is preset, an extracted primary color of a page is used as a background color of a tab background color. A preset tab background color can help avoid a recognition error or even a recognition failure caused in a scenario in which a primary color is not easily extracted from some pages. For example, an icon of a website includes multiple different colors having same or similar proportions or a primary color of an icon of a web site is inconsistent with a primary color of website content, thereby helping improving recognition efficiency and a recognition of the webpage.

In conclusion, the solution not only helps a user identify a tab to facilitate viewing and improve operability by the user, but also improves recognition efficiency and a recognition effect of the webpage as well as an effectiveness of recognizing and propagating information in a tab.

Figure 4A:
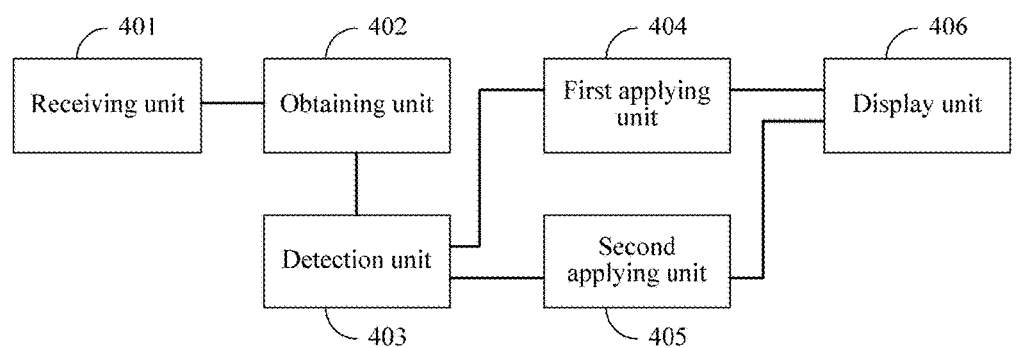
FIG. 4a is a schematic diagram of an apparatus for processing a tab in a graphical interface.

An embodiment of this disclosure further provides an apparatus for processing a tab in a graphical interface. As shown in FIG. 4a, the apparatus for processing a tab in a graphical interface may include a receiving unit 401, an obtaining unit 402, a detection unit 403, a first applying unit 404, a second applying unit 405, and a display unit 406.

The receiving unit 401 is configured to receive a page access request triggered by a user by using a graphical interface.

For example, specifically, a link address entered by the user in an address bar in the graphical interface may be received, to trigger the page access request. Alternatively, a link interface or a trigger key in the graphical interface may be clicked by the user to trigger the page access request. Details are not further provided herein.

The page access request may carry information such as an address of a page that needs to be accessed.

The graphical interface may be specifically a browser or another application that is used for displaying content of HTML files from a web server or a file system and that can enable interaction between the user and the files. For ease of description, in this embodiment of this disclosure, the browser is used as an example for description.

The obtaining unit 402 is configured to obtain a corresponding page according to the page access request.

For example, the obtaining unit 402 may send the page access request to a corresponding web server according to the address of the page that is carried in the page access request, and receive a web page returned by the web server according to the page access request.

For another example, the obtaining unit 402 may send the page access request to a corresponding device according to the address of the page that is carried in the page access request, and receive a file such as a picture or a video returned by the device according to the page access request.

The detection unit 403 is configured to detect whether a tab background color has been set for the page.

There are multiple detection manners, and a detection manner may be specifically determined according to a setting manner of the tab background color. The tab background color may also be set in multiple manners. For example, a tab background color parameter may be set in content of a page, and the tab background color may be set by assigning a value to the tab background color parameter. Alternatively, the tab background color may be set by specifying a link address of the tab background color, for example, a URL. For example, details may be specifically as follows:

The detection unit 403 may be specifically configured to: obtain content of the page, the content of the page including a tab background color parameter; determine whether a value of the tab background color parameter is a preset value; and if the value of the tab background color parameter is the preset value, determine that the tab background color has been set, and determine the tab background color according to the preset value; or if the value of the tab background color parameter is not the preset value, determine that the tab background color has not been set.

The preset value may be determined according to a requirement in an actual application. The preset value may be one value, several values, or a range of one value or several values. Details are not further provided herein.

Alternatively, the detection unit 403 may be specifically configured to: determine whether there is a corresponding link address of the tab background color on the page; and if there is a corresponding link address of the tab background color on the page, determine that the tab background color has been set, and obtain the tab background color according to the link address; or if there is no corresponding link address of the tab background color on the page, determine that the tab background color has not been set.

The link address of the tab background color may be set by a website on which a page is located (that is, may be set by using a default URL in a fixed rule), or may be set in page content, for example, web content. Specific composition elements of the link address may be determined according to a requirement in an actual application, for example, by using a domain name plus a particular path (for example, tab-background-color).

The first applying unit 404 is configured to: when the detection unit determines that the tab background color has been set, apply a background color to a tab corresponding to the page according to the tab background color, to obtain a colored tab.

The second applying unit 405 is configured to: when the detection unit determines that the tab background color has not been set, extract a primary color of the page, and apply a background color to a tab corresponding to the page according to the primary color, to obtain a colored tab.

The primary color of the page may be extracted in multiple manners. For example, an icon (favicon) of the page may be determined; then, a primary color of the icon is extracted; and the primary color of the page is calculated according to the primary color of the icon. Alternatively, the primary color of the webpage content when displayed by a browser may be extracted and set as the background color of the tab.

That is, the second applying unit 405 may be specifically configured to: when the detection unit determines that the tab background color has not been set, determine an icon of the page; extract a primary color of the icon, and calculate the primary color of the page according to the primary color of the icon; and apply the background color to the tab corresponding to the page according to the primary color of the page, to obtain the colored tab.

It should be noted that the primary color of the icon or the webpage may be extracted in multiple manners. For example, the primary color may be extracted according to a proportion of a number of pixels having a particular color, and then the primary color of the page is calculated by using a preset algorithm. In one implementation, the displayed webpage or the favicon may first be pixelized. Pixelization of the web page content for example, may be obtained by analyzing the HTML file of the webpage and the include files therein (images, videos, and other files). The R, G, B values of the pixels of either the pixelized webpage or the pixelzied favicon may be averaged to obtain a single average color represented by the averaged R, G and B values of all pixels. Alternatively, the pixels of either the webpage or the favicon may be binned according to predefined color bins in the R, G, B space, and the color bin having the largest number of pixels may be considered the primary color of the webpage or the favicon. In one implementation and when the displayed webpage content is used to extract the primary color, some pixels, such as those of particular color, e.g., white, may be ignored since most web contents have white background and it may be preferable to not weigh any of the white background pixels in determining the primary color of the web page. Different primary colors of a page may be obtained by using different algorithms. Details are not further provided herein.

The display unit 406 is configured to display the page and the colored tab in the graphical interface.

For example, the display unit 406 may be specifically configured to: display content of the page in a page display area in the graphical interface, and display the colored tab in a tab bar.

Figure 4B:
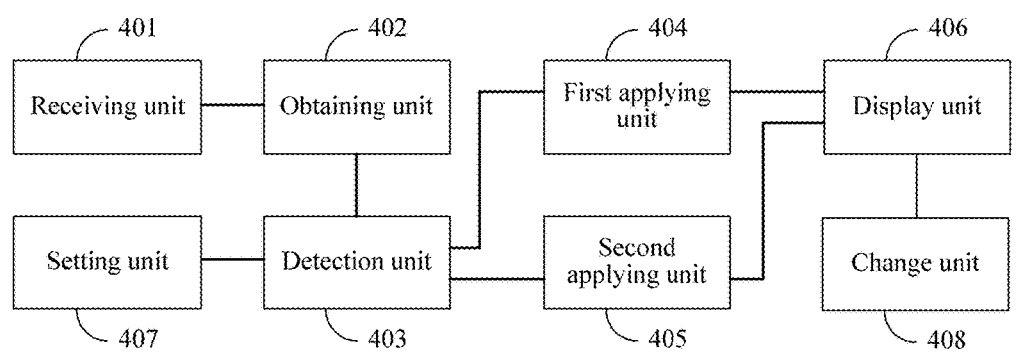
FIG. 4b is another schematic diagram of an apparatus for processing a tab in a graphical interface.

In some embodiments of this disclosure, to facilitate setting of the tab background color in a web page, an interface for dynamically setting the tab background color may be further provided in the graphical interface. If the tab background color needs to be set, the corresponding interface is invoked to implement setting of the tab background color. That is, as shown in FIG. 4b, the apparatus for processing a tab in a graphical interface may further include a setting unit 407, configured to set the tab background color of the page.

In some embodiments, the setting unit 407 may be configured to: receive a tab background color setting request entered on the web page by using a preset interface in the graphical interface, the background color setting request carrying a color that needs to be set or other information; and use the color that needs to be set as the tab background color of the page.

The preset interface may be set according to a requirement in an actual application. Details are not further provided herein.

In some embodiments of this disclosure, it may be further set that the tab of the page is displayed as the colored tab only when the page is activated, for example, when a user clicks the tab corresponding to the page to browse the page. Otherwise, the tab of the page may be displayed as an ordinary tab. The ordinary tab is a tab that is not different from other tabs in background color. A background color of the ordinary tab may also be preset according to a requirement in an actual application. That is, as shown in FIG. 4b, the apparatus for processing a tab in a graphical interface may further include a change unit 408, configured to change the background color of the colored tab that is of the page and that is displayed in the graphical interface into a preset color when a newly-established tab or another tab in the graphical interface is selected.

After this, if the tab of the page in the graphical interface is selected again (reselected), for example, the user clicks the tab of the page, the tab of the page in the graphical interface may be changed into the colored tab again for highlighting, to indicate that the page corresponding to the colored tab is a page that is currently being browsed by the user.

That is, the change unit 408 is further configured to: when the tab of the page in the graphical interface is selected, change the tab of the page in the graphical interface into the colored tab.

In the specific implementation, the above units may be implemented as separate entities, or may be combined in any way and implemented as one or several entities. For the specific implementation of the above units, reference may be made to the above method embodiments, and details are omitted herein.

The apparatus for processing a tab in a graphical interface may be specifically integrated in a device such as a terminal, or may be installed in a device such as a terminal in a software form. The terminal may be specifically a device such as a mobile phone, a tablet computer, a notebook computer, or a PC.

It can be understood from the foregoing descriptions that in this embodiment, when the apparatus for processing a tab in a graphical interface receives a page access request triggered by a user by using a graphical interface, the obtaining unit 402 obtains a corresponding page according to the page access request; the detection unit 403 detects whether a tab background color has been set for the page; if the tab background color has been set, the first applying unit 404 applies a background color to a tab corresponding to the page according to the tab background color, to obtain a colored tab; or if the tab background color has not been set, the second applying unit 405 extracts a primary color of the page, and applies a background color to a tab corresponding to the page according to the primary color, to obtain a colored tab; and the display unit 406 displays the page and the colored tab in the graphical interface. In this solution, different background colors may be set for tabs of different pages, so that the tabs highlight brand information of websites. Therefore, identifiability of a tab is significantly improved. The tabs can thus be easily distinguished by users. In addition, in this solution, a background color may be flexibly set for a tab according to a different case. For example, when it is detected that a tab background color is preset, the preset tab background color is used as a background color of a tab; when it is detected that no tab background color is preset, an extracted primary color of a page is used as a background color of a tab background color. A preset tab background color can help avoid a recognition error or even a recognition failure caused in a scenario in which a primary color is not easily extracted from some pages, for example, an icon of a website includes multiple different colors having same or similar proportions or a primary color of an icon of a website is inconsistent with a primary color of website content, thereby helping improving recognition efficiency and a recognition of the webpage.

In conclusion, the solution not only helps a user identify a tab to facilitate viewing and improve operability by the user, but also improves recognition efficiency and a recognition effect of the webpage as well as an effectiveness of recognizing and propagating information in a tab.

Figure 5:
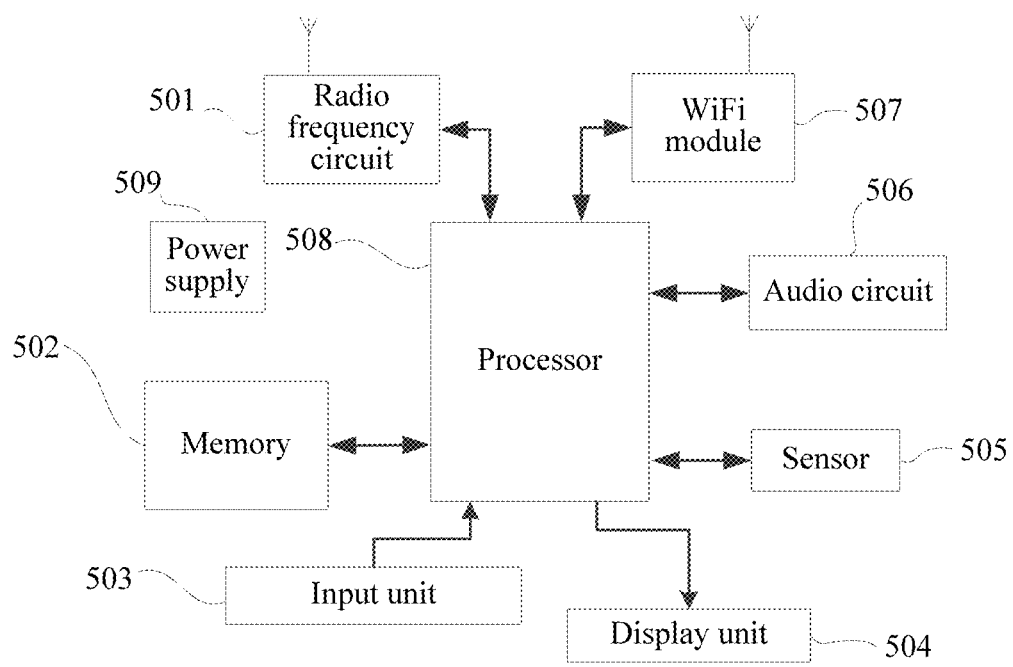
FIG. 5 is a schematic diagram of a terminal.

Correspondingly, an embodiment of this disclosure further provides a terminal. As shown in FIG. 5, the terminal may include parts such as a radio frequency (RF) circuit 501, a memory 502 including one or more computer readable storage media, an input unit 503, a display unit 504, a sensor 505, an audio circuit 506, a wireless fidelity (Wi-Fi) module 507, a processor 508 including one or more processing cores, and a power supply 509. A person skilled in the art may understand that the terminal structure shown in FIG. 5 does not constitute a limit to the terminal. The terminal may include more or fewer parts than those shown in the figure, may combine some parts, or may have different part arrangements.

The RF circuit 501 may be configured to perform information sending and receiving or receive and send a signal during a call. Especially, the RF circuit 501 sends, after receiving downlink information of a base station, the information to one or more processors 508 for processing, and sends involved uplink data to the base station. Generally, the RF circuit 501 includes but is not limited to an antenna, at least one amplifier, a tuner, one or more oscillators, a subscriber identity module (SIM) card, a transceiver, a coupler, a low noise amplifier (LNA), a duplexer, and the like. In addition, the RF circuit 501 may further communicate with a network and another device by means of wireless communication. The wireless communication may use any communications standard or protocol, which includes, but is not limited to, Global System for Mobile Communications (GSM), General Packet Radio Service (GPRS), Code Division Multiple Access (CDMA), Wideband Code Division Multiple Access (WCDMA), Long Term Evolution (LTE), e-mail, Short Message Service (SMS), and the like.

The memory 502 may be configured to store a software program and module. The processor 508 executes various functions and applications and performs data processing by running the software program and modules stored in the memory 502. The memory 502 may mainly include a program storage area and a data storage area. The program storage area may store an operating system, an application program required by at least one function (such as a sound playing function and an image display function), and the like. The data storage area may store data (such as audio data and an address book) created according to use of the terminal, and the like. In addition, the memory 502 may include a high speed random access memory, and may also include a non-volatile memory such as at least one magnetic disk storage device, a flash memory, or another volatile solid-state storage device. Correspondingly, the memory 502 may further include a memory controller, to provide access of the processor 508 and the input unit 503 to the memory 502.

The input unit 503 may be configured to receive entered numeric or character information and generate keyboard, mouse, joystick, optical, or trackball signal input related to user settings and function control. Specifically, in a specific embodiment, the input unit 503 may include a touch-sensitive surface and another input device. The touch-sensitive surface, which may also be referred to as a touch screen or a touch panel, may collect a touch operation of a user on or near the touch-sensitive surface (such as an operation of a user on or near the touch-sensitive surface by using any suitable object or accessory such as a finger or a stylus), and drive a corresponding connection apparatus according to a preset program. In some embodiments of this disclosure, the touch-sensitive surface may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 508. In addition, the touch controller can receive and execute a command sent from the processor 508. In addition, the touch-sensitive surface may be implemented in multiple types, such as a resistive type, a capacitive type, an infrared type, and a surface acoustic wave type. In addition to the touch-sensitive surface, the input unit 503 may further include another input device. Specifically, the another input device may include but is not limited to one or more of a physical keyboard, a function key (for example, a volume control key or a power on/off key), a trackball, a mouse, or a joystick.

The display unit 504 may be configured to display information entered by the user or information provided to the user, and graphical user interfaces of the terminal. The graphical user interfaces each may include an image, text, an icon, a video, or any combination thereof. The display unit 504 may include a display panel. In some embodiments of this disclosure, the display panel may be configured in a form of a liquid crystal display (LCD), an organic light-emitting diode (OLED) display, or the like. Further, the touch-sensitive surface may cover the display panel. After detecting a touch operation on or near the touch-sensitive surface, the touch-sensitive surface transfer the touch operation to the processor 508 to determine a type of a touch event, and then the processor 508 provides corresponding visual output on the display panel according to the type of the touch event. Although in FIG. 5, the touch-sensitive surface and the display panel are used as two separate parts to implement input and output functions, in some embodiments, the touch-sensitive surface and the display panel may be integrated to implement the input and output functions.

The terminal may further include at least one sensor 505, for example, a light sensor, a motion sensor, and other sensors. Specifically, the light sensor may include an ambient light sensor and a proximity sensor. The ambient light sensor may adjust luminance of the display panel according to brightness of ambient light, and the proximity sensor may turn off the display panel and/or backlight when the terminal moves close to an ear. As a motion sensor, a gravity accelerometer sensor can detect acceleration magnitudes in all directions (generally three axes), can detect a magnitude and a direction of gravity when static, and can be applied to a mobile phone posture recognition application (for example, screen switching between landscape and portrait, related games, and magnetometer posture calibration), a function related to vibration recognition (for example, a pedometer or a tap gesture recognizer), and the like. Other sensors such as a gyroscope, a barometer, a hygrometer, a thermometer, and an infrared sensor that may also be configured in the terminal are not described herein.

The audio circuit 506, a speaker, and a microphone can provide an audio interface between the user and the terminal. The audio circuit 506 may transmit, to the speaker, an electrical signal that is obtained after received audio undergoes data conversion, and the speaker converts the electrical signal into a sound signal for output. In another aspect, the microphone converts a collected sound signal into an electrical signal, the audio circuit 506 receives the electrical signal, converts it into audio data, and then outputs the audio data to the processor 508 for processing, and then the audio data is sent to, for example, another terminal, by using the RF circuit 501, or the audio data is output to the memory 502 for further processing. The audio circuit 506 may further include a headset jack to provide communication between a peripheral headset and the terminal.

Wi-Fi belongs to a short-distance wireless transmission technology. The terminal may help, by using the Wi-Fi module 507, the user send and receive an email, browse a web page, access streaming media, and the like. The Wi-Fi module 507 provides wireless broadband Internet access for the user. Although FIG. 5 shows the Wi-Fi module 507, it may be understood that the Wi-Fi module 507 is not a mandatory part of the terminal, and may completely be omitted as required without changing the scope of the essence of this disclosure.

The processor 508 is a control center of the terminal, and is connected to various parts of the entire mobile phone by using various interfaces and lines. By running or executing the software program and/or module stored in the memory 502, and invoking data stored in the memory 502, the processor 508 performs various functions and data processing of the terminal, thereby an overall monitoring on the mobile phone. In some embodiments of this disclosure, the processor 508 may include one or more processing cores. In some embodiments of this disclosure, the processor 508 may integrate an application processor and a modem processor. The application processor mainly processes an operating system, a user interface, an application program, and the like. The modem processor mainly processes wireless communication. It may be understood that the foregoing modem processor may be separate from the processor 508.

The terminal further includes the power supply 509 (for example, a battery) that supplies power to each part. In some embodiments of this disclosure, the power supply may be logically connected to the processor 508 by using a power supply management system, so that functions such as management of charging, discharging, and power consumption are implemented by using the power supply management system. The power supply 509 may further include any component, such as one or more direct current power supplies or alternating current power supplies, a recharging system, a power supply fault detection circuit, a power converter or a power inverter, or a power status indicator.

Although not shown, the terminal may further include a camera, a Bluetooth module, and the like. Details are not further provided herein. Specifically, in this embodiment, the processor 508 of the terminal may load, according to the following instructions, executable files corresponding to processes of one or more application programs into the memory 502. The processor 508 runs the application programs stored in the memory 502, to implement various functions:

receiving a page access request triggered by a user by using a graphical interface; obtaining a corresponding page according to the page access request; detecting whether a tab background color has been set for the page; if the tab background color has been set, applying a background color to a tab corresponding to the page according to the tab background color, to obtain a colored tab; or if the tab background color has not been set, extracting a primary color of the page, and applying a background color to a tab corresponding to the page according to the primary color, to obtain a colored tab; and displaying the page and the colored tab in the graphical interface.

There are multiple detection manners, and a detection manner may be specifically determined according to a setting manner of the tab background color. The tab background color may also be set in multiple manners. For example, a tab background color parameter may be set in content of a page, and the tab background color may be set by assigning a value to the tab background color parameter. Alternatively, the tab background color may be set by setting a link address of the tab background color, for example, a URL.

The link address of the tab background color may be set by a website on which a page is located (that is, may be set by using a default URL in a fixed rule), or may be set in page content, for example, web content. Specific composition elements of the link address may be determined according to a requirement in an actual application, for example, by using a domain name plus a particular path (for example, tab-background-color).

The primary color of the page may be extracted in multiple manners. For example, an icon (favicon) of the page may be determined; then, a primary color of the icon is extracted; and the primary color of the page is calculated according to the primary color of the icon. The icon of the page, that is, the favicon, is usually displayed on the left side of a tab bar, or may be displayed in bookmarks or history records.

Similarly, the primary color of the icon may also be extracted in multiple manners. For example, the primary color may be extracted according to color statistics of pixels, and then the primary color of the page is calculated by using a preset algorithm. Different primary colors of a page may be obtained by using different algorithms. Details are not further provided herein.

In some embodiments of this disclosure, it may be further set that the tab of the page is displayed as the colored tab only when the page is activated, for example, when a user clicks the tab corresponding to the page to browse the page. Otherwise, the tab of the page may be displayed as an ordinary tab. A background color of the ordinary tab may also be preset according to a requirement in an actual application. That is, the processor 508 may further execute the following functional instruction:

changing the background color of the colored tab that is of the page and that is displayed in the graphical interface into a preset color when a newly-established tab or another tab in the graphical interface is selected.

After this, if the tab of the page in the graphical interface is selected again, for example, the user clicks the tab of the page, the tab of the page in the graphical interface may be changed into the colored tab again for highlighting, to indicate that the page corresponding to the colored tab is a page that is currently being browsed by the user. That is, the processor 508 may further execute the following functional instruction:

when the tab of the page in the graphical interface is selected, changing the tab of the page in the graphical interface into the colored tab.

In some embodiments of this disclosure, to facilitate setting of the tab background color in a web page, an interface for dynamically setting the tab background color may be further provided in the graphical interface. If the tab background color needs to be set, the corresponding interface is invoked to implement setting of the tab background color. That is, the processor 508 may further execute the following functional instruction:

setting the tab background color of the page. For example, details may be specifically as follows:

receiving a tab background color setting request entered on the web page by using a preset interface in the graphical interface, the background color setting request carrying a color that needs to be set or other information; and using the color that needs to be set as the tab background color of the page.

The preset interface may be set according to a requirement in an actual application. Details are not further provided herein.

For specific implementation of the above operations, refer to the foregoing embodiments. Details are further provided herein.

It can be understood from the foregoing descriptions that in this embodiment, when receiving a page access request triggered by a user by using a graphical interface, a terminal obtains a corresponding page according to the page access request; detects whether a tab background color has been set for the page; if the tab background color has been set, applies a background color to a tab corresponding to the page according to the tab background color, to obtain a colored tab; or if the tab background color has not been set, extracts a primary color of the page, and applies a background color to a tab corresponding to the page according to the primary color, to obtain a colored tab; and display the page and the colored tab in the graphical interface. In this solution, different background colors may be set for tabs of different pages, so that the tabs highlight brand information of websites. Therefore, identifiability of a tab is significantly improved. The tabs can thus be easily distinguished by users. In addition, in this solution, a background color may be flexibly set for a tab according to a different case. For example, when it is detected that a tab background color is preset, the preset tab background color is used as a background color of a tab; when it is detected that no tab background color is preset, an extracted primary color of a page is used as a background color of a tab background color. A preset tab background color can help avoid a recognition error or even a recognition failure caused in a scenario in which a primary color is not easily extracted from some pages, for example, an icon of a website includes multiple different colors having same or similar proportions or a primary color of an icon of a website is inconsistent with a primary color of website content, thereby helping improving recognition efficiency and a recognition of the webpage.

In conclusion, the solution not only helps a user identify a tab to facilitate viewing and improve operability by the user, but also improves recognition efficiency and a recognition effect of the webpage well as an effectiveness of recognizing and propagating information in a tab.

A person of ordinary skill in the art may understand that all or some of the steps of the methods in the foregoing embodiments may be implemented by a program instructing relevant hardware. The program may be stored in a computer readable storage medium. The storage medium may be a read-only memory (ROM), a random access memory (RAM), a magnetic disk, an optical disc, or the like.

The method and the apparatus for processing a tab in a graphical interface provided in the embodiments of this disclosure are described above in detail. This specification explains the principles and implementations of this disclosure by using specific examples. The descriptions of the foregoing embodiments are merely intended to help understand the method of this disclosure and the core idea of this disclosure. In addition, a person skilled in the art may make some variations in specific implementations and disclosure scopes according to the idea of this disclosure. Therefore, this specification shall not be understood as a limit to this disclosure.

What is claimed is:

1. A method for processing a tab in a graphical interface, comprising:

receiving, by a terminal device having a processor and a memory storing instructions executed by the processor, a data page access request triggered by a user in a graphical interface of the terminal device for viewing data pages identified by corresponding tabs, where the tabs are displayed outside of the data pages in a tab bar of the graphical interface;

obtaining a corresponding data page according to the data page access request;

detecting whether a tab background color has been set for the data page;

when it is detected that the tab background color has been set for the data page, applying the set tab background color to a tab corresponding to the data page to obtain a colored tab of the data page;

when it is detected that the tab background color has not been set, extracting a primary color of the data page with pixels having a page background color for the data page excluded, and applying the primary color of the data page to the tab corresponding to the data page to obtain the colored tab of the data page; and displaying the data page and the colored tab in the graphical interface.

2. The method according to claim 1, wherein detecting whether the tab background color has been set for the data page comprises:

obtaining content of the data page comprising a tab background color parameter;

determining whether the tab background color parameter contains a preset color value; and when the determining determines that the tab background color parameter contains the preset color value, indicating that the tab background color has been set; or when the determining determines that the value of the tab background color parameter does not contain the preset color value, indicating that the tab background color has not been set.

3. The method according to claim 1, wherein detecting whether the tab background color has been set for the data page comprises:
- determining whether there is a corresponding link address contained in the data page for locating the tab background color; and
- when the determining determines that there is a corresponding link address contained in the data page for the tab background color on the data page, indicating that the tab background color has been set; or
- when the determining determines that there is no corresponding link address contained in the data page for the tab background color on the data page, indicating that the tab background color has not been set.

4. The method according to claim 1, wherein extracting the primary color of the data page with pixels having a page background color for the data page excluded comprises:
- determining an icon of the data page; and
- extracting a primary color of the icon, and determining the primary color of the data page according to the primary color of the icon.

5. The method according to claim 1, further comprising: setting the tab background color of the data page.

6. The method according to claim 5, wherein setting the tab background color of the data page comprises:
- receiving a tab background color setting request entered on the data page by using a preset interface in the graphical interface, the background color setting request carrying a requested color value that needs to be set; and
- setting the requested color value as the tab background color of the data page.

7. The method according to any one of claim 1, after displaying the data page and the colored tab in the graphical interface, further comprising:
- when a newly-established tab of a new data page or another tab of another data page in the graphical interface is selected, changing the background color of the colored tab of the data page displayed in the graphical interface into a preset default color.

8. The method according to claim 7, after the changing the background color of the tab of the data page displayed in the graphical interface into a preset default color, further comprising:
- when the tab of the data page in the graphical interface is selected again, changing the tab of the data page in the graphical interface into the colored tab.

9. An apparatus for processing a tab in a graphical interface, comprising:
- a memory storing instructions;
- a processor in communication with the memory, the processor, when executing the instructions, configured to cause the apparatus to:
- receive a data page access request triggered by a user in a graphical interface for viewing data pages identified and selected by corresponding tabs, where the tabs are displayed outside of the data pages in a tab bar of the graphical interface;
- obtain a corresponding data page according to the data page access request;
- detect whether a tab background color has been set for the data page;
- when it is detected that the tab background color has been set for the data page, apply the set tab background color to a tab corresponding to the data page to obtain a colored tab of the data page;
- when it is detected that the tab background color has not been set, extract a primary color of the data page with pixels having a page background color for the data page excluded, and apply the primary color of the data page to the tab corresponding to the data page to obtain the colored tab of the data page; and
- display the data page and the colored tab in the graphical interface.

10. The apparatus according to claim 9, wherein the processor, when executing the instructions to cause the apparatus to detect whether the tab background color has been set, is configured to cause the apparatus to:
- obtain content of the data page comprising a tab background color parameter;
- determine whether the tab background color parameter contains a preset color value; and
- when it is determined that the tab background color parameter contains the preset color value, indicate that the tab background color has been set; or
- when it is determined that the value of the tab background color parameter does not contain the preset color value, indicate that the tab background color has not been set.

11. The apparatus according to claim 9, wherein the processor, when executing the instructions to cause the apparatus to detect whether the tab background color has been set, is configured to cause the apparatus to:
- determine whether there is a corresponding link address contained in the data page for the tab background color on the data page; and
- when it is determined that there is a corresponding link address contained in the data page for the tab background color on the data page, indicating that the tab background color has been set; or
- when it is determined that there is no corresponding link address contained in the data page for the tab background color on the data page, indicating that the tab background color has not been set.

12. The apparatus according to claim 9, wherein the processor, when executing the instructions to extract the primary color of the data page with pixels having a page background color for the data page excluded, is configured to cause the apparatus to:
- determine an icon of the data page; and
- extract a primary color of the icon, and determine the primary color of the data page according to the primary color of the icon.

13. The apparatus according to claim 9, wherein the processor, when executing the instructions, is further configured to cause the apparatus to set the tab background color of the data page.

14. The apparatus according to claim 13, wherein the processor, when executing the instructions to set the tab background color of the data page, is configured to cause the apparatus to:
- receive a tab background color setting request entered on the data page by using a preset interface in the graphical interface, the background color setting request carrying a requested color value that needs to be set; and
- set the requested color value as the tab background color of the data page.

15. The apparatus according to claim 9, wherein the processor, when executing the instructions, is further configured to cause the apparatus to:

change the background color of the colored tab of the data page displayed in the graphical interface into a preset default color when a newly-established tab of a new data page or another tab of another data page in the graphical interface is clicked by the user.

16. The apparatus according to claim 15, wherein the processor, when executing the instructions to change the background color of the colored tab into a preset default color, is configured to cause the apparatus to:
when the tab of the data page in the graphical interface is selected again, change the tab of the data page in the graphical interface into the colored tab.

17. A non-transitory computer readable storage medium, the storage medium storing machine readable instructions, the machine readable instructions being executed by a processor to complete the following operations:
receiving, by a terminal device having a processor and a memory storing instructions executed by the processor, a data page access request triggered by a user in a graphical interface of the terminal device for viewing data pages identified and selected by corresponding tabs, where the tabs are displayed outside of the data pages in a tab bar of the graphical interface;
obtaining a corresponding data page according to the data page access request;
detecting whether a tab background color has been set for the data page;
when it is detected that the tab background color has been set for the data page, applying the set tab background color to a tab corresponding to the data page to obtain a colored tab of the data page; or
when it is detected that the tab background color has not been set, extracting a primary color of the data page with pixels having a page background color for the data page excluded, and applying the primary color of the data page to the tab corresponding to the data page to obtain the colored tab of the data page; and
displaying the data page and the colored tab in the graphical interface.

* * * * *